(12) United States Patent
Bruchmann et al.

(10) Patent No.: US 9,834,691 B2
(45) Date of Patent: Dec. 5, 2017

(54) HYPERBRANCHED POLYESTERS IN PRINTING INKS

(75) Inventors: Bernd Bruchmann, Freinsheim (DE); Monika Haberecht, Ludwigshafen (DE); Chien Lu Hsu, Grosse Ile, MI (US); John Campbell, Grosse Ile, MI (US); James W. Taylor, Grosse Ile, MI (US)

(73) Assignee: BASF SE, Ludwigshafen (DE)

( * ) Notice: Subject to any disclaimer, the term of this patent is extended or adjusted under 35 U.S.C. 154(b) by 326 days.

(21) Appl. No.: 14/009,160

(22) PCT Filed: Apr. 13, 2012

(86) PCT No.: PCT/EP2012/056734
§ 371 (c)(1),
(2), (4) Date: Nov. 19, 2013

(87) PCT Pub. No.: WO2012/140175
PCT Pub. Date: Oct. 18, 2012

(65) Prior Publication Data
US 2014/0193619 A1 Jul. 10, 2014

Related U.S. Application Data

(60) Provisional application No. 61/475,841, filed on Apr. 15, 2011.

(51) Int. Cl.
| | | |
|---|---|---|
| C09D 11/10 | (2014.01) | |
| C09D 11/102 | (2014.01) | |
| C09D 11/104 | (2014.01) | |
| C09D 167/00 | (2006.01) | |
| C09D 167/03 | (2006.01) | |
| C09D 101/18 | (2006.01) | |
| C08L 67/00 | (2006.01) | |

(Continued)

(52) U.S. Cl.
CPC ............ *C09D 11/104* (2013.01); *C09D 11/02* (2013.01); *B32B 15/08* (2013.01); *B32B 15/085* (2013.01); *B32B 15/088* (2013.01); *B32B 15/09* (2013.01); *B32B 15/20* (2013.01); *B32B 27/08* (2013.01); *B32B 27/20* (2013.01); *B32B 27/302* (2013.01); *B32B 27/32* (2013.01); *B32B 27/34* (2013.01); *B32B 27/36* (2013.01); *B32B 2250/03* (2013.01); *B32B 2255/26* (2013.01); *B32B 2307/75* (2013.01); *C08G 63/12* (2013.01); *C08G 63/123* (2013.01); *C08G 63/137* (2013.01); *C08G 63/16* (2013.01); *C08G 63/18* (2013.01); *C08G 63/199* (2013.01); *C08G 63/20* (2013.01); *C08K 3/0033* (2013.01); *C08K 3/04* (2013.01); *C08K 3/08* (2013.01); *C08K 3/22* (2013.01); *C08K 5/0041* (2013.01); *C08K 5/23* (2013.01); *C08K 5/34* (2013.01); *C08K 2003/2206* (2013.01); *C08K 2003/2227* (2013.01); *C08K 2003/2241* (2013.01); *C08K 2003/2265* (2013.01); *C08L 1/18* (2013.01); *C08L 67/00* (2013.01); *C08L 67/03* (2013.01); *C09D 11/10* (2013.01); *C09D 11/102* (2013.01); *C09D 101/18* (2013.01); *C09D 167/00* (2013.01); *C09D 167/03* (2013.01); *Y10T 428/24802* (2015.01); *Y10T 428/24851* (2015.01); *Y10T 428/24876* (2015.01); *Y10T 428/24901* (2015.01); *Y10T 428/24909* (2015.01); *Y10T 428/24917* (2015.01); *Y10T 428/3175* (2015.04); *Y10T 428/31681* (2015.04); *Y10T 428/31692* (2015.04); *Y10T 428/31725* (2015.04); *Y10T 428/31736* (2015.04); *Y10T 428/31757* (2015.04); *Y10T 428/31786* (2015.04); *Y10T 428/31797* (2015.04); *Y10T 428/31855* (2015.04); *Y10T 428/31909* (2015.04); *Y10T 428/31913* (2015.04); *Y10T 428/31938* (2015.04)

(58) Field of Classification Search
None
See application file for complete search history.

(56) References Cited

U.S. PATENT DOCUMENTS

| | | | |
|---|---|---|---|
| 5,556,925 A | 9/1996 | Kousaka et al. | |
| 6,162,860 A * | 12/2000 | Anderson | C08G 81/024 524/507 |

(Continued)

FOREIGN PATENT DOCUMENTS

| | | | |
|---|---|---|---|
| EP | 0 707 956 A1 | 4/1996 | |
| EP | 0 802 045 A1 | 10/1997 | |

(Continued)

OTHER PUBLICATIONS

Flory, Paul J., "Molecular Size Distribution in Three Dimensional Polymers. VI. Branched Polymers Containing A-R-B(f-1) Type Units," J. Am. Chem. Soc., (Jun. 5, 1952), vol. 74, Issue 11, pp. 2718-2723.
Gao, C. et al., "Hyperbranched polymers: from synthesis to applications," Prog. Polym. Sci., (Mar. 2004), vol. 29, Issue 3, pp. 183-275.
Holter, D. et al., "Degree of branching in hyperbranched polymers," Acta Polym., (Feb. 1997), vol. 48, Issue 1-2, pp. 30-35.
International Search Report issued in PCT/EP2012/056789 dated Jul. 4, 2012 (4 pages).
Sunder, Alexander et al., "Controlling the Growth of Polymer Trees: Concepts and Perspectives for Hyperbranched Polymers," Chem. Eur. J., (Jul. 17, 2000), vol. 6, No. 14, pp. 2499-2506.
Non-Final Office Action received in U.S. Appl. No. 14/009,126 dated Jun. 11, 2015, 10 pages.
International Search Report issued in PCT/EP2012/056734 dated Jul. 9, 2012 (3 pages).

(Continued)

Primary Examiner — Vivian Chen
(74) Attorney, Agent, or Firm — Foley & Lardner LLP

(57) ABSTRACT

The invention relates to multilayer materials for producing packaging comprising at least two films and also a layer which is printed with a packaging printing ink, said packaging printing ink comprising a certain hyperbranched polyester containing functional groups. The invention further relates to a packaging printing ink which comprises a certain hyperbranched polyester containing functional groups, and to the use of said printing ink for producing multilayer materials.

13 Claims, No Drawings

(51) Int. Cl.

| | | |
|---|---|---|
| *C08L 67/03* | (2006.01) | |
| *C08L 1/18* | (2006.01) | |
| *C08K 3/04* | (2006.01) | |
| *C08K 3/08* | (2006.01) | |
| *C08K 3/22* | (2006.01) | |
| *C08K 5/23* | (2006.01) | |
| *C08K 5/34* | (2006.01) | |
| *B32B 15/09* | (2006.01) | |
| *B32B 15/085* | (2006.01) | |
| *B32B 15/088* | (2006.01) | |
| *B32B 15/20* | (2006.01) | |
| *B32B 27/20* | (2006.01) | |
| *B32B 27/32* | (2006.01) | |
| *B32B 27/34* | (2006.01) | |
| *B32B 27/36* | (2006.01) | |
| *C09D 11/02* | (2014.01) | |
| *C08G 63/12* | (2006.01) | |
| *C08G 63/123* | (2006.01) | |
| *C08G 63/137* | (2006.01) | |
| *C08G 63/16* | (2006.01) | |
| *C08G 63/18* | (2006.01) | |
| *C08G 63/199* | (2006.01) | |
| *C08G 63/20* | (2006.01) | |
| *C08K 5/00* | (2006.01) | |
| *C08K 3/00* | (2006.01) | |
| *B32B 15/08* | (2006.01) | |
| *B32B 27/08* | (2006.01) | |
| *B32B 27/30* | (2006.01) | |

(56) References Cited

U.S. PATENT DOCUMENTS

| | | | | |
|---|---|---|---|---|
| 6,194,510 B1 * | 2/2001 | Anderson | | C08G 81/024 |
| | | | | 524/502 |
| 7,858,732 B2 * | 12/2010 | Bruchmann | | C08G 63/20 |
| | | | | 428/480 |
| 7,858,733 B2 * | 12/2010 | Bruchmann | | C08G 63/20 |
| | | | | 428/480 |
| 8,044,170 B2 * | 10/2011 | Bruchmann | | C08G 63/20 |
| | | | | 428/480 |
| 8,853,331 B2 * | 10/2014 | Bruchmann | | C08G 64/0216 |
| | | | | 525/462 |
| 2002/0156188 A1 * | 10/2002 | Anderson | | C08F 293/00 |
| | | | | 525/107 |
| 2003/0092797 A1 | 5/2003 | Wang et al. | | |
| 2004/0024087 A1 * | 2/2004 | Bruchmann | | C08G 18/0823 |
| | | | | 523/160 |
| 2005/0147834 A1 | 7/2005 | Bruchmann et al. | | |
| 2005/0165177 A1 * | 7/2005 | Wagner | | C08G 63/12 |
| | | | | 525/437 |
| 2005/0250914 A1 * | 11/2005 | Stumbe | | C08G 83/005 |
| | | | | 525/437 |
| 2007/0027269 A1 * | 2/2007 | Stumbe | | C08G 63/20 |
| | | | | 525/445 |
| 2007/0213501 A1 * | 9/2007 | Bruchmann | | C08G 63/20 |
| | | | | 528/302 |
| 2007/0293634 A1 * | 12/2007 | Stumbe | | C08G 63/668 |
| | | | | 525/437 |
| 2010/0048813 A1 | 2/2010 | Clauss et al. | | |
| 2014/0065385 A1 * | 3/2014 | Bruchmann | | C09D 11/104 |
| | | | | 428/203 |
| 2014/0357833 A1 * | 12/2014 | Bruchmann | | C08G 64/0216 |
| | | | | 528/370 |
| 2016/0185086 A1 * | 6/2016 | Hsu | | B32B 27/08 |
| | | | | 428/201 |

FOREIGN PATENT DOCUMENTS

| | | | |
|---|---|---|---|
| EP | 1 743 911 A1 | 1/2007 | |
| WO | WO 00/77070 | * 12/2000 | |
| WO | WO-2007/125029 | 11/2007 | |

OTHER PUBLICATIONS

Non-Final Office Action received for U.S. Appl. No. 14/009,126 dated Jan. 22, 2016, 7 pages.
Final Office Action on U.S. Appl. No. 14/009,126 dated May 23, 2016.
"Printing and Laminating for Ingeo™ Film," NatureWorks LLC, accessed on Oct. 7, 2016 at http://www.natureworksllc.com/~/media/Technical_Resources/Fact_Sheets/FactSheet_Printing-and-Laminating_pdf.pdf.

* cited by examiner

HYPERBRANCHED POLYESTERS IN PRINTING INKS

CROSS REFERENCE TO RELATED APPLICATIONS

This application is a U.S. national stage application of International Application No. PCT/EP2012/056734, filed on Apr. 13, 2012, which claims the benefit of U.S. Provisional Patent Application No. 61/475,841, filed on Apr. 15, 2011, the entire disclosures of which are incorporated herein by reference for any and all purposes.

The invention relates to preparing printing inks, especially, for packaging applications. Lamination packaging is composed of multilayer materials. It is comprising at least two pieces of polymeric film and also a layer which is printed with a packaging printing ink, said packaging printing ink comprising a certain hyperbranched polyester containing functional groups. The invention further relates to a packaging printing ink which comprises a certain hyperbranched polyester containing functional groups, and to the use of said printing ink for producing multilayer materials.

Multilayer materials for producing packaging, especially food packaging, are known. Multilayer materials of this kind are composed of two or more polymer films, polyolefin films for example, metal foils or metallized polymer films, which are joined to one another, for example, by lamination with the aid of suitable laminating adhesives. The films (incl. foils) may each be monolayer, or multilayer films produced by co-extrusion. The laminates may further comprise other functional layers, examples being odor barrier layers or water vapor barriers.

Multilayer materials for producing packaging are usually printed, or coated. The printing ink may be applied to the inside surface of one of the films (namely, reverse printing) or else may be between two films. Printing varnishes could be applied to the print substrate as a primer to improve ink adhesion to substrates. Printing varnishes contain no colorant, but apart from that are generally similar in their composition to printing inks.

The requirements imposed on printing varnishes and printing inks which are suitable for producing multilayer packaging materials are diverse. When printing onto non-absorbent print substrates such as polymer films or metal foils, the printing ink cannot penetrate into the substrate, but instead leaves a dried film on the substrate after the solvent has evaporated. Printing inks for such substrates must therefore have very good film-forming properties and good adhesive strength, so that the printed ink film does not detach from the substrate film under mechanical stress. Printing inks are also required to adhere equally well to different kinds of substrates, since laminates frequently contain films which differ from one another chemically, examples being polar polyamide, or PET films and non-polar polyolefin films, suitable. Thus, with the aid of adhesives, the lamination structure has to have the minimal bond strength to hold the multi-layers together. Bond strength of lamination is assessed by measuring the force required by peeling the film layers apart from each other, normally a tensile tester is used.

Dendrimers, arborols, starburst polymers, and hyperbranched polymers are designations for polymeric structures which feature a branched structure with numerous branching sites and high functionality. Dendrimers are molecularly uniform macromolecules having a highly symmetrical structure. However, they can only be synthesized with great complexity comprising a large number of synthesis steps, and as a consequence are available only in small amounts and at very great cost.

In contrast, hyperbranched polymers are non-uniform both molecularly and structurally. They contain arms which differ in length and branching. A general definition of hyperbranched polymers is given in P. J. Flory, J. Am. Chem. Soc. 1952, 74, pages 2718-2723, and in H. Frey et al., Chem. Eur. J. 2000, 6, no. 14, pages 2499 to 2506, which is incorporated by reference.

Multilayer materials printed with printing inks comprising hyperbranched polymers are disclosed in US 2005/0147834 A1. The document discloses hyperbranched polyesters in general and their use in printing inks, inter alia for producing multilayer materials. Explicitly disclosed are polyesters produced by condensation of adipic acid and trimethylol propane resp. glycerol. Printing inks comprising hyperbranched polyesters with nitrocellulose as co-binder are explicitly disclosed. However, the ratio of hyperbranched polyester to all binders is low and does not exceed 0.43 in the examples.

US 2007/0213501 A1 discloses hyperbranched polyesters produced by polycondensation of at least one diacid, at least one diol, and at least one at least trifunctional alcohol or at least one at least trifunctional acid. Furthermore the use of such hyperbranched polyesters in printing inks is taught. Again, printing inks comprising hyperbranched polyesters with nitrocellulose as co-binder are explicitly disclosed. However, the ratio of hyperbranched polyester to all binders is low and does not exceed 0.43 in the examples (formula 1 in US 2007/0213501 A1).

It is an objective of the invention to provide multilayer materials for producing packaging, which exhibit a lamination bond strength which is at least comparable to commercially available products. In the mean time, the printing ink made with the invention resins should meet the basic requirements for flexographic or gravure printing; such as tape adhesion, and blocking resistance property at least the same level as the printing inks of the cited prior art. The invention enables inks with higher non-volatile concentration, or a lower VOC furthermore, higher pigment loading, at a viscosity which is not higher than that of the printing inks from the prior art. The higher non-volatile concentration results in higher color density, better gloss, and/or higher opacity.

We have found that this objective is achieved by multilayer materials for producing packaging, comprising at least
one film 1 of a polymeric material,
one print layer obtainable by printing or coating with a packaging printing ink, one further film 2,
the packaging printing ink comprising at least two binders, the first binder comprising at least one hyperbranched polyester containing functional groups selected from the group consisting of OH, COOH and COOR groups,
wherein the radical R in the esterified carboxyl group comprises groups having from 1 to 60 carbon atoms and optionally may also contain heteroatoms or further substituents,
wherein the hyperbranched polyester is obtainable by reacting
at least one cycloaliphatic or aromatic dicarboxylic acid $(A_2)$ or their derivatives selected from the group consisting of phthalic acid, isophthalic acid, terephthalic acid, 1,2-cyclohexane dicarboxylic acid, 1,3-cyclohexane dicarboxylic acid, 1,4-cyclohexane dicarboxylic acid and methyl hexahydrophthalic or derivatives thereof and at least one at least trivalent aliphatic alcohol ($C_x$), containing x OH groups selected from the group consisting of trimethylolpropane, glycerol, and pentaerythritol, with essentially no diol ($B_2$) containing 2 OH groups present, the molecular weight of the polyester, $M_n$, being at least 300 g/mol and the polydispersity $M_w/M_n$ being 1.2-10, and the ratio of the reactive groups of all of the components in the reaction mixture being chosen so as to set a molar ratio of hydroxyl groups to carboxyl groups or derivatives thereof of from 2:1 to 1:2 the second binder being selected from the group consisting of polyvinylbutyral, nitrocellulose, polyamides, polyurethanes, polyvinyl chlorides, polyketones, polycarbonates, polyacrylates and polyacrylate copolymers, wherein the weight ratio of hyperbranched polyester to the total amount of all the binders is at least 50% by weight.

The invention secondly provides a packaging printing ink for flexographic and/or gravure printing which comprises at least one solvent or a mixture of different solvents, at least one pigment and/or dye, at least one polymeric binder, and, optionally, additives. At least one of the polymeric binders comprising a hyperbranched polyester as defined above containing functional groups selected from the group consisting of OH, COOH and COOR groups.

The invention further provides a method of printing said packaging printing ink onto printing polymer films or metal foils and for producing multilayer materials.

The invention further provides a printing varnish for flexographic and/or gravure printing which comprises at least one solvent or a mixture of different solvents, at least one polymeric binder, and, optionally, additives. At least one of the polymeric binders comprises at least one hyperbranched polyester as defined above containing functional groups selected from the group consisting of OH, COOH and COOR groups.

Through the use of packaging printing inks with binders comprising the above-mentioned hyperbranched polyesters containing OH, COOH and COOR groups the VOC content of the printing inks can be decreased significantly, since the hyperbranched polyester binders enable printing inks with reduced viscosities compared to printing inks derived from commercially available high-molecular polyurethane binders or prior art polyurethane binders, such as those disclosed in EP 1743911 A. Furthermore, the above-mentioned hyperbranched polyesters can be used in higher amounts in the printing ink so that the amount of other binders, especially nitrocellulose, can be reduced, and the pigment loading can be increased.

Details of the invention are set out below.

The film 1 for the multilayer material is composed of a polymeric material. Films suitable for packaging materials are published, for example, in Ullmann's Encyclopedia of Industrial Chemistry, 6th Edt., 2000, Electronic Release. They include, for example, polyolefin films such as films of polyethylene, polypropylene or poly(4-methyl-1-pentene) or polystyrene. Polyethylene films may be films of HDPE, LDPE or LLDPE. They may be copolymers such as, for example, films of ethylene-vinyl acetate copolymers (EVA), ethylene-vinyl alcohol copolymers (EVOH), ethylene-acrylic acid copolymers (EAA), ethylene-methacrylic acid copolymers (EMM), or styrene/butadiene copolymers.

Furthermore, polypropylene films may be used, preferably oriented polypropylene (OPP) or biaxial oriented (BOPP) films.

It is also possible to use films of polystyrene (PS), PVC, PVdC, polylactic acid (PLA) or polycarbonate films.

Moreover, films of polar materials may be used, examples being cellophane films, polyester films, such as those of polyethylene terephthalate, polybutylene terephthalate or polyethylene naphthalate, for example, or polyamide films, such as films of PA 66, PA 6, PA 12, PA 6/66, PA 6/12 or PA 11, for example.

Film 1 is preferably a film of polyethylene, polypropylene, polystyrene, polyester or polyamide, with very particular preference being given to PET, PEN, and polyamide films.

Film 1 may be a monolayer film. Alternatively, it may be a multilayer film. Multilayer films are preferably produced by co-extrusion. The layers may be composed of chemically identical, similar or different polymers. For example, a polyvinyl alcohol layer may be embedded between two polyolefin films, or LLDPE combined with LDPE. The term "multilayer films" also embraces laminates of polymer films and metal foils, especially aluminum foils.

The films may also be coated. Examples that may be mentioned here include metallized films, especially films vapor coated with Al, or films (vapor) coated with silicon oxide ($SiO_2$) or aluminum oxide ($Al_2O_3$).

For film 2 it is possible to use polymer films, including metallized polymer films, or metal foils. Suitable polymer films include in particular the materials disclosed for film 1. Metal foils used in particular are aluminum foils, although it is also possible, for example, for these foils to be tin foils, copper foils or gold foils.

Particularly preferred multilayer materials comprise at least one polar film in combination with a nonpolar film. Examples that may be mentioned include laminates of polyamide films or polyester films with polyolefin films, especially polyethylene or polypropylene films. Further preference is given to multilayer materials of polyamide and polyester films or to laminates containing in each case only polyamide or only polyester films.

Preferably film 1 is selected from the group consisting of PE, PP, PET, and polyamides, more preferably selected from the group consisting of PE, PP, and PET, and even more preferably selected from the group consisting of PE, OPP, and PET.

Preferably film 2 is selected from the group consisting of optionally metallized PE, non-metallized PE, OPP, and PET, more preferably selected from the group consisting of optionally metallized or non-metallized PE, OPP and PET, and even more preferably selected from the group consisting of PE, OPP and PET.

In one embodiment of the invention film 1 and film 2 both are OPP.

In another embodiment of the invention film 1 is PET and film 2 is PE.

The multilayer material of the invention further comprises at least one print layer which is obtainable by printing or coating at least one of the films with a packaging printing ink.

The printed layer may be on the outside of the multilayer material. Preferably, however, the print layer is between the two films, i.e., embedded in the laminate. The print layer may lie directly on one of the films or there may be one or more other layers between the film and the print layer. The print layer is preferably printed directly either onto film 1 or onto film 2.

The multilayer material may also comprise two or more print layers. With preference, all of the print layers include a hyperbranched polyester according to the invention containing the functional groups defined at the outset. The minimum requirement, however, is that at least one of the print layers contains said hyperbranched polyester. The print layers may be printed over one another. For example, first layer is a color, for example, may be printed onto a film, followed by a second layer with a white- or multicolor decoration. Alternatively, the primer can be printed onto one film and the decoration onto the other film, or else the primer onto one side and the decoration onto the other side of the same film.

Of course, a multilayer laminate may also include further films in addition to films 1 and 2. The sequence of the films in the laminate is determined by the skilled worker in accordance with the desired properties and the intended use of the multilayer material.

The multilayer material may also comprise additional layers with which in each case particular properties can be achieved. Mention may be made here in particular of adhesive layers, which can be used to join some or all of the layers to one another. Further, it is possible to incorporate additional barrier layers. By way of example, polyvinyl alcohol layers or ethylene-polyvinyl alcohol layers may be incorporated as water vapor barriers. It is also possible to install odor or aroma barriers. Suitable materials for this purpose are disclosed, for example, in EP-A 707 956 or EP-A 802 045.

The print layers in the multilayer material are obtainable by printing or coating the films with an appropriate packaging printing ink. Printing is carried out preferably by means of flexographic or gravure methods, although screen printing, or inkjet printing can be used in special cases.

The term "packaging printing inks" or "printing inks for packaging" for the purposes of this invention are meant solvent-containing printing inks for flexographic and/or gravure printing which cure by evaporation of the solvent. The term "printing inks for packaging" is both self-explanatory and restrictive. Printing inks for packaging are fast-drying printing inks with low viscosity about 50-200 mPa (millipascals), preferably, 80-150 mPa in accordance with ASTM D2196 (Brookfield) at 25° C. at a shear rate of 30 rpm, spindle number 62. Accordingly, they contain relatively low-boiling solvents. Their boiling point is generally from 50° C. to 140° C. at 1013 hPa (hectopascal).

Screen printing inks are formulated in much the same way as flexographic or gravure inks but are adjusted to a slightly higher viscosity and normally contain solvents with boiling points from 60° C. to 170° C. at 1013 hPa.

In accordance with the invention, the printing ink comprises a binder component that is based on a hyperbranched polyester containing functional groups selected from the group consisting of OH, COOH and COOR groups defined at the outset. The term "binder" as well is self-explanatory and at the same time restrictive. Binders are one of the principal constituents of printing inks and are responsible for the actual formation of a film. They provide for the anchoring of pigments and fillers in the ink film and for adhesion to the substrate, and are used in the amount necessary to achieve this effect.

The present invention is performed with hyperbranched polyesters in the actual sense, i.e., molecularly and structurally nonuniform, highly branched polyesters.

Hyperbranched polyesters can be synthesized starting from a central molecule in the same way as for dendrimers but with the chain length of the branches lacking uniformity. On the other hand they can also be of linear construction, with functional side groups, or else, as a combination of the two extremes, may include linear and branched moieties. On the definition of dendrimers and hyperbranched polymers see also P. J. Flory, J. Am. Chem. Soc. 1952, 74, 2718 and H. Frey et al., Chemistry—A European Journal, 2000, 6, No. 14, 2499. A survey of the different synthesis strategies for obtaining hyperbranched polymers is given in C. Gao, D. Yan, Prog. Polym. Sci. 29 (2004), 183-275.

Hyperbranched polymers can be characterized by their degree of branching (DB). The DB is defined by $$DB\ (\%) = (T+Z)/(T+Z+L) \times 100, \text{ with}$$

T medium number of terminal bound monomers,
Z medium number of branching causing monomers
L medium number of linear bound monomers.

By "hyperbranched" in connection with the present invention is meant that the degree of branching (DB), in other words the average number of dendritic linkages plus the average number of end groups per molecule, is from 10% to 99.9%, preferably from 20% to 95%, more preferably 25% to 90%, and most preferably from 30% to 80%.

By "dendrimer" in the context of the present invention is meant that the degree of branching is 99.9%-100%. On the definition of the degree of branching see H. Frey et al., Acta Polym. 1997, 48, 30-35.

The hyperbranched polyesters according to the invention contain one or more functional groups selected from the group consisting of OH, COOH, and COOR groups.

The radical R in the esterified carboxyl group preferably comprises groups having from 1 to 60 carbon atoms. The groups may also contain heteroatoms or further substituents.

The radicals R may be selected from the group comprising alkyl, cycloalkyl, aryl, and aralkyl groups, which may also contain heteroatoms or further substituents, preferably selected from the group comprising $C_1$- to $C_{20}$-alkyl, $C_3$- to $C_{12}$-cycloalkyl, $C_6$- to $C_{20}$-aryl, and $C_7$- to $C_{20}$-aralkyl groups, which may also contain heteroatoms or further substituents, and more preferably selected from the group comprising $C_1$- to $C_8$-alkyl, $C_5$- to $C_{12}$-cycloalkyl, $C_6$- to $C_{12}$-aryl, and $C_7$- to $C_{10}$-aralkyl groups without heteroatoms or further substituents, and most preferably are $C_1$- to $C_8$-alkyl without heteroatoms or further substituents.

Examples of R include $C_1$-$C_8$ alkyl radicals, such as methyl, ethyl, propyl, isopropyl, n-butyl, i-butyl, t-butyl, hexyl, octyl radicals, for example, or $C_6$-$C_{12}$ aryl or arylalkyl radicals such as benzyl radicals, for example. Preference extends to radicals which contain oxygen atoms in the chain and have the formula —(CHR'—CHR"O)$_n$H, n customarily being a natural number from 1-20 and R' and R" independently of one another being alternatively H or a methyl or ethyl group, preferably being a hydrogen atom.

The COOR group may already be present in the monomeric units for the polymer; alternatively, it can be generated by subsequent functionalization of a COOH group or of a derivative thereof.

The functional groups are essentially terminal groups, although the functional groups may also be arranged pendantly.

With particular preference, the hyperbranched polyester used in accordance with the invention contains both OH and COOH groups.

The polyesters used can be characterized conventionally by their hydroxyl number and their acid number. Preference is given to using hyperbranched polyesters which have an acid number of from 10 to 200 mg KOH/g, preferably 20 to 180, very preferably 50 to 150 and especially preferably 70 to 130 mg KOH/g and also an hydroxyl number of from 50 to 500 mg KOH/g, preferably 100 to 400, very preferably 120 to 300 and especially preferably 150 to 250 mg KOH/g although the invention is not restricted to such.

The acid number was determined according to previous DIN 53402. The hydroxyl number is determined according to DIN 53240, part 2.

The molar mass is chosen by the skilled worker in accordance with the type of application that is intended. Products which have proven appropriate are those having a number-average molecular weight $M_n$ of at least 300, preferably at least 400, more preferably at least 500, and especially preferably at least 600 g/mol. The upper limit of the molecular weight Mn is preferably 25,000 g/mol, more preferably it is not more than 15,000 g/mol, with very particular preference it is not more than 10,000 g/mol, and especially preferably not more than 5,000 g/mol.

The uniformity of the hyperbranched polyesters may be indicated conventionally through the ratio Mw/Mn. Mw/Mn is generally from 1.1 to 20, preferably from 1.2 to 15, with very particular preference from 1.2 to 10, and especially from 1.3 to 5.

The figures given for polydispersity and also for the number-average and weight-average molecular weight $M_n$ and $M_w$ refer here to measurements made by gel permeation chromatography using polymethyl methacrylate as the standard and tetrahydrofuran, dimethylacetamide or hexafluoroisopropanol as the eluent. The method is described in Analytiker Taschenbuch Vol. 4, pages 433 to 442, Berlin 1984.

Preferred polyesters in accordance with the invention have a glass transition temperature of from 0 to 100° C., preferably 25 to 55° C. and very preferably 30 to 50° C.

The glass transition temperature $T_g$ is determined by the DSC method (differential scanning calorimetry) in accordance with ASTM 3418/82.

The synthesis of the hyperbranched polyesters may preferably take place as depicted below, without the invention being thereby restricted to the use of the polyesters synthesized by this preparation method.

The hyperbranched polyester according to the invention is obtainable by reaction of at least one cycloaliphatic or aromatic dicarboxylic acid ($A_2$) selected from the group consisting of phthalic acid, isophthalic acid, terephthalic acid, 1,2-cyclohexane dicarboxylic acid, 1,3-cyclohexane dicarboxylic acid, 1,4-cyclohexane dicarboxylic acid and methylhexahydrophthalic or derivatives thereof with at least one at least trivalent aliphatic alcohol ($C_x$), containing x OH groups selected from the group consisting of trimethylolpropane, glycerol, and pentaerythritol.

The dicarboxylic acid ($A_2$) may be cycloaliphatic or aromatic, preferably cycloaliphatic.

According to the invention the dicarboxylic acid ($A_2$) is selected from the group consisting of phthalic acid, isophthalic acid, terephthalic acid, 1,2-cyclohexane dicarboxylic acid, 1,3-cyclohexane dicarboxylic acid, 1,4-cyclohexane dicarboxylic acid and methylhexahydrophthalic or derivatives thereof, preferably selected from the group consisting of 1,2-cyclohexane dicarboxylic acid, 1,3-cyclohexane dicarboxylic acid, 1,4-cyclohexane dicarboxylic acid and methylhexahydrophthalic or derivatives thereof, very preferably selected from the group consisting of 1,2-cyclohexane dicarboxylic acid and 1,4-cyclohexane dicarboxylic acid and derivatives thereof and especially preferably it is 1,2-cyclohexane dicarboxylic acid or derivatives thereof.

The carboxylic acid groups in the cycloaliphatic dicarboxylic acids can be either in cis- or in trans-configuration, preferably in cis-configuration. The cycloaliphatic dicarboxylic acids employed can also be mixtures of cis- and trans-configuration products, with the cis-configuration being the dominant isomer.

In case of 1,2-cyclohexane dicarboxylic acid anhydride the cis-isomer is preferably the dominant isomer.

The dicarboxylic acids can be used either as such or in the form of derivatives.

By derivatives are meant preferably
the corresponding anhydrides in monomeric or else polymeric form,
monoalkyl or dialkyl esters, preferably mono- or di-$C_1$-$C_4$ alkyl esters, more preferably monomethyl or dimethyl esters or the corresponding monoethyl or diethyl esters, additionally monovinyl and divinyl esters, and also
mixed esters, preferably mixed esters with different $C_1$-$C_4$ alkyl components, more preferably mixed methyl ethyl esters.

$C_1$-$C_4$ alkyl for the purposes of this specification means methyl, ethyl, isopropyl, n-propyl, n-butyl, isobutyl, sec-butyl and tert-butyl, preferably methyl, ethyl and n-butyl, more preferably methyl and ethyl and very preferably methyl.

Preferably the dicarboxylic acids ($A_2$) may be used as free acids, as anhydrides or as di-$C_1$-$C_4$ alkyl esters, very preferably as anhydrides or as di-$C_1$-$C_4$ alkyl esters, in particular as anhydrides or as dimethyl esters, and especially as anhydrides.

The formation of intramolecular anhydrides is usually possible only in aromatic 1,2-carboxylic acids and in cycloaliphatic 1,2- and 1,3-carboxylic acids with cis-configuration.

For the sake of clarity it should be mentioned that when the dicarboxylic acids ($A_2$) are used as anhydrides for the determination of the molar ratio of hydroxyl groups to carboxyl groups one anhydride group counts as two carboxyl groups.

Within the context of the present invention it is also possible to use a mixture of a dicarboxylic acid and one or more of its derivatives. Likewise possible within the context of the present invention is to use a mixture of two or more different derivatives of one or more dicarboxylic acids.

The at least one trivalent aliphatic alcohol ($C_x$), containing x OH groups is selected from the group consisting of trimethylolpropane, glycerol and pentaerythritol, preferably it is trimethylolpropane or pentaerythritol and very preferably trimethylolpropane.

According to the invention the at least trivalent aliphatic alcohol ($C_x$) is trivalent or tetravalent, preferably trivalent.

It is possible to use mixture of different at least trivalent aliphatic alcohols ($C_x$), for example 1 to 3, preferably 1 or 2, and very preferably 1.

The hyperbranched polyesters according to the invention do essentially contain no diols ($B_2$). Preferred hyperbranched polyesters according to the invention consist essentially of dicarboxylic acids ($A_2$) and aliphatic alcohols ($C_x$), very preferred hyperbranched polyesters according to the invention consist of dicarboxylic acids ($A_2$) and aliphatic alcohols ($C_x$) only.

Diols ($B_2$) can be aliphatic, cycloaliphatic or aromatic compounds containing two hydroxyl groups. The ratio of hydroxyl groups from diols ($B_2$) to the total amount of hydroxyl groups from alcohols ($C_x$) and diols ($B_2$) in the polyesters according to the invention is usually not more than 0.2, preferably not more than 0.1 and very preferably 0.

The molar ratio of hydroxyl groups in the at least trivalent aliphatic alcohol ($C_x$) to carboxyl groups in the dicarboxylic acid ($A_2$) is from 2:1 to 1:2, preferably from 1.5:1 to 1:2, in particular from 1.5:1 to 1:1.5.

In the simplest case the reaction mixtures consist only of the mixtures of the components which are to be reacted with one another. However, the reaction mixtures can also include solvents, suitable esterification or transesterification catalysts, and also, where appropriate, further additives.

The process for the preparation of the above-mentioned hyperbranched polyesters can be carried out in bulk or in the presence of a solvent. Examples of suitable solvents include hydrocarbons such as paraffins or aromatics. Particularly suitable paraffins are n-heptane and cyclohexane. Particularly suitable aromatics are toluene, ortho-xylene, meta-xylene, para-xylene, xylene isomer mixture, ethylbenzene, chlorobenzene and ortho- and meta-dichlorobenzene. Of further suitability as solvents in the absence of acidic catalysts are, very preferably, ethers, such as dioxane or tetrahydrofuran, for example, and ketones such as methyl ethyl ketone and methyl isobutyl ketone, for example.

The amount of solvent added is in accordance with the invention at least 0.1% by weight, based on the mass of the starting materials employed that are to be reacted, preferably at least 1% by weight and more preferably at least 10% by weight. It is also possible to use excesses of solvent, based on the mass of starting materials employed that are to be reacted, such as from 1.01 to 10 times. Solvent amounts of more than 100 times, based on the mass of starting materials employed that are to be reacted, are not advantageous, since at significantly lower reactant concentrations the reaction rate subsides significantly, leading to uneconomically long reaction times.

In one preferred embodiment the reaction is carried out without addition of solvent.

The process results in hyperbranched polymers of a higher solids content than in other processes.

To carry out the process of the invention it is possible to operate in the presence of a water-removing agent, as an additive added at the beginning of the reaction. Suitable examples include molecular sieves, especially molecular sieve 4 Å, $MgSO_4$ and $Na_2SO_4$. It is also possible during the reaction to add further water remover or to replace water remover by fresh water remover. It is also possible to remove water and/or alcohol formed, during the reaction, by distillation and, for example, to use a water separator, in which case the water is removed with the aid of an azeotrope former.

Separation of water may also take place by stripping: for example, by passing a gas which is inert under the reaction conditions through the reaction mixture, additionally, if appropriate, to a distillation. Suitable inert gases include preferably nitrogen, noble gases, carbon dioxide, combustion gases, or oxygen depleted air (lean air) with an oxygen content e.g. from 4 to 10 vol %.

The process of the invention can be carried out in the absence of catalysts.

In one embodiment of the present invention the reaction is conducted in the presence of at least one catalyst. These are preferably acidic inorganic, organometallic or organic catalysts or mixtures of two or more acidic inorganic, organometallic or organic catalysts.

Acidic inorganic catalysts for the purposes of the present invention are for example sulfuric acid ($H_2SO_4$), sulfates and hydrogen sulfates, such as sodium hydrogen sulfate ($NaHSO_4$), phosphoric acid ($H_3PO_4$), phosphonic acid ($H_3PO_3$), hyperphosphoric acid ($H_3PO_2$), aluminum sulfate hydrate, alum, acidic silica gel (pH≤6, especially ≤5) and acidic aluminum oxide. Further acidic inorganic catalysts which can be used include, for example, aluminum compounds of the general formula $Al(OR^1)_3$ and titanates of the general formula $Ti(OR^1)_4$, it being possible for the radicals $R^1$ to be identical or different in each case and to be selected independently of one another from $C_1$-$C_{20}$ alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, iso-amyl, n-hexyl, isohexyl, sec-hexyl, n-heptyl, isoheptyl, n-octyl, 2-ethylhexyl, n-nonyl, n-decyl, n-dodecyl, n-hexadecyl or n-octadecyl, for example, $C_3$-$C_{12}$ cycloalkyl radicals, such as cyclopropyl, cyclobutyl, cyclopentyl, cyclohexyl, cycloheptyl, cyclooctyl, cyclononyl, cyclodecyl, cycloundecyl and cyclododecyl, for example; preferably cyclopentyl, cyclohexyl and cycloheptyl.

The radicals $R^1$ in $Al(OR^1)_3$ and/or $Ti(OR^1)_4$ are preferably each identical and selected from n-butyl, isopropyl and 2-ethylhexyl.

Preferred acidic organometallic catalysts are chosen for example from dialkyltin oxides $R^1_2SnO$ or dialkyltin esters $R^1_2Sn(OR^2)_2$, in which $R^1$ is as defined above and can be identical or different.

$R^2$ can have the same definitions as $R^1$ and additionally can be $C_6$-$C_{12}$ aryl; phenyl, o-, m- or p-tolyl, xylyl or naphthyl, for example. $R^2$ can in each case be identical or different.

Examples of organotin catalysts are tin(II) n-octanoate, tin(II) 2-ethylhexanoate, tin(II) laurate, dibutyltin oxide, diphenyltin oxide, dibutyltin dichloride, dibutyltin diacetate, dibutyltin dilaurate, dibutyltin dimaleate or dioctyltin diacetate.

Particularly preferred representatives of acidic organometallic catalysts are dibutyltin oxide, diphenyltin oxide and dibutyltin dilaurate. Further possible organometallic catalysts are organometallic bismuth or zirconium compounds.

Preferred acidic organic catalysts are acidic organic compounds containing, for example, phosphate groups, sulfonic acid groups, sulfate groups or phosphonic acid groups. Particular preference is given to sulfonic acids such as para-toluene sulfonic acid, benzene sulfonic acid, dodecylbenzene sulfonic acid, methanesulfonic acid, and trifluoromethane sulfonic acid, for example. Acidic ion exchangers can also be used as acidic organic catalysts, examples being polystyrene resins which contain sulfonic acid groups and have been crosslinked with about 2 mol % of divinylbenzene.

Combinations of two or more of the aforementioned catalysts can also be employed. A further possibility is to use organic or organometallic or else inorganic catalysts that are in the form of discrete molecules in an immobilized form, on silica gel or on zeolites, for example.

If it is desired to use acidic inorganic, organometallic or organic catalysts then the amount of catalyst used is in accordance with the invention from 0.1% to 10% by weight, preferably from 0.2% to 2% by weight.

In one embodiment the esterification catalyst is an enzyme. Preference is given to the use of lipases and esterases. A particularly suitable example is Candida antarctica lipase B. The enzyme is available commercially, for example, from Novozymes Biotech Inc., Denmark.

The enzyme is preferably employed in immobilized form, on silica gel or Lewatit®, for example. Methods of immobilizing enzymes are known per se, for example, from Kurt Faber, "Biotransformations in organic chemistry", 3rd edition 1997, Springer Verlag, section 3.2 "Immobilization" pages 345-356. Immobilized enzymes are available commercially, for example, from Novozymes Biotech Inc., Denmark. The amount of enzyme used is usually from 1 to 20% by weight, in particular 10-15% by weight, based on the mass of the starting materials employed overall.

For carrying out the process of the invention it is one preferred embodiment to forego the use of enzymes.

In another preferred embodiment a non-metal containing catalyst is used for carrying out the process.

In an especially preferred embodiment no catalyst is used for carrying out the process. The latter is especially preferred in those cases, in which the multilayer materials according to the invention are used as food packaging. The latter is furthermore especially preferred in those cases in which compound ($A_2$) is an acid anhydride.

The process for the preparation of the above-mentioned hyperbranched polyesters is carried out preferably under an inert gas atmosphere, i.e., a gas which is inert under the reaction conditions, such as under carbon dioxide, combustion gases, oxygen depleted air (lean air) with an oxygen content e.g. from 4 to 10 vol %, nitrogen or noble gas, for example, among which argon may be mentioned in particular.

The process of the invention is carried out at temperatures from 60 to 250° C. It is preferred to operate at temperatures from 80 to 200° C., more preferably at 100 to 180° C. When using enzymes, 100° C. ought not to be exceeded.

The pressure conditions of the process of the invention are not generally critical. It is possible to operate at a significantly reduced pressure, such as at from 10 to 500 mbar, for example. The process of the invention can also be carried out at pressures above 500 mbar. Preference is given, on grounds of simplicity, to reaction at atmospheric pressure; also possible, however, is its implementation at a slightly elevated pressure, up to 1200 mbar for example. It is also possible to operate under significantly increased pressure, at pressures of up to 10 bar, for example. Reaction under reduced or atmospheric pressure is preferred, particular preference being given to atmospheric pressure.

The reaction time of the process of the invention is normally from 10 minutes to 48 hours, preferably from 30 minutes to 24 hours and more preferably from 1 to 12 hours.

After the end of the reaction the high-functionality hyperbranched polyesters can be isolated easily, by for example filtering off the catalyst and stripping off the solvent if appropriate, in which case the stripping of the solvent is normally carried out under reduced pressure. Further highly suitable workup methods are precipitation of the polymer following addition of water and subsequent washing and drying.

Within the context of the present invention the hyperbranched polyesters of the invention can also be used in a mixture with other binders.

Examples of further binders for the printing inks of the invention comprise polyvinylbutyral, nitrocellulose, polyamides, polyurethanes, polyvinyl chlorides, polyketones, polycarbonates, polyacrylates or polyacrylate copolymers. Preferred further binders are selected from the group consisting of nitrocellulose, polyurethanes, and polyvinylbutyral, especially preferred as further binders are nitrocellulose and/or polyurethanes. A combination which has proven particularly advantageous is that of the hyperbranched polyesters with nitrocellulose. The total amount of all the binders in the printing ink of the invention is normally 5%-35% by weight, preferably 6%-30% by weight and more preferably 10%-25% by weight, based on the sum of all the constituents.

The weight ratio of hyperbranched polyester to the total amount of all the binders is at least 50% by weight, preferably at least 60% and especially preferably at least 70%.

The weight ratio of hyperbranched polyester to the total amount of all the binders is less than 100%, preferably not more than 90%, especially preferably not more than 80% by weight.

Nitrocellulose as binder can be used with a nitrogen content from up to less than 12.6% by weight (degree of nitration up to 85%). Preferred nitrocellulose is ester-soluble with a nitrogen content from 11.88 to 12.2 wt % and alcohol-soluble with a nitrogen content from 10.9 to 11.3 wt %, very preferably is the alcohol-soluble nitrocellulose.

Polyurethanes as binders are e.g described in EP 1743911 A1, paragraph [0018] to [0070] or U.S. Pat. No. 5,556,925 from column 4, line 9 to column 9, line 24, both disclosures are incorporated into the present application by reference.

A single solvent or else a mixture of two or more solvents is to be used. Solvents suitable in principle include the customary solvents for printing inks, especially packaging inks. Particularly suitable as solvents for the printing ink of the invention are alcohols such as, for example, ethanol, 1-propanol, 2-propanol, ethylene glycol, propylene glycol, diethylene glycol, substituted alcohols such as ethoxypropanol and esters such as ethyl acetate, isopropyl acetate, and n-propyl, n-butyl, or t-butyl acetate, for example. Water is also a suitable solvent in principle. Particularly preferred solvents are ethanol or mixtures composed predominantly of ethanol, and ethyl acetate. Among the solvents possible in principle the skilled worker will make an appropriate selection in accordance with the solubility properties of the hyperbranched polyester and with the desired drying speed required by the printing ink. Slow drying solvents can also be formulated with the invention. Typical slow drying solvents are glycol ethers, such as Dowanol™ PM (mono propyleneglycol mono methyl ether) or DPM (dipropylene glycol methyl ether) or ethoxy propanol. It is normal to use from 40% to 80% by weight of solvent relative to the sum of all the constituents of the printing ink.

Typical lamination packaging white ink formulated with traditional linear polyurethane contains 40% to 70% by weight solvent. A comparable hyperbranched polyester based white ink according to the present invention has 5 to 20%, preferably 10 to 12% by weight less solvent at equal print viscosity. With this measurement, the amount of VOC in the hyperbranched polyester based inks is lower than the traditional linear polyurethane based inks.

Colorants which can be used include the customary dyes and, in particular, customary pigments. Examples are inorganic pigments such as titanium dioxide pigments or iron oxide pigments, interference pigments, carbon blacks, metal powders, such as particularly aluminum, brass or copper powder, and also organic pigments such as azo, phthalocyanine or isoindoline pigments, but not limited to. Examples of preferred organic pigments are phthalocyanine blue 15:4, phthalocyanine green 7, green 36, yellow 12, yellow 14, red 57:1, and red 52:1. It is of course also possible to use mixtures of different dyes or colorants, and also soluble organic dyes. It is usual to use from 5% to 25% by weight of colorant, relative to the sum of all the constituents.

The packaging ink of the invention may optionally comprise further additives and auxiliaries. Examples of additives and auxiliaries are fillers such as calcium carbonate, aluminum oxide hydrate or aluminum and/or magnesium silicate. Waxes raise the abrasion resistance and serve to enhance the lubricity. Examples are, in particular, polyethylene waxes, oxidized polyethylene waxes, petroleum waxes or ceresin waxes. Fatty acid amides can be used for increasing the surface smoothness. Plasticizers serve to enhance the elasticity of the dried film. Examples are phthalates such as dibutyl phthalate, diisobutyl phthalate, dioctyl phthalate, citric esters or esters of adipic acid. For dispersing the pigments it is possible to use dispersing assistants. For improved adhesion of the ink to its substrate film adhesion promoters can be used. Examples are titanium chelates. In the case of the printing ink of the invention it is possible, advantageously, to work without adhesion promoters, although this is not intended to rule out the use of adhesion promoters. The total amount of all of the additives and auxiliaries normally does not exceed 20% by weight relative to the sum of all the constituents of the printing ink, and is preferably 0% to 10% by weight.

The packaging ink of the invention can be prepared in a way which is known in principle, by intensively mixing and/or dispersing the constituents in customary apparatus such as dissolvers, stirred ball mills or a triple-roll mill, for example. Advantageously, a concentrated pigment dispersion is first prepared with a portion of the components and a portion of the solvent, and is subsequently processed further to the finished printing ink with additional constituents and further solvent.

In a further preferred aspect the present invention provides print varnishes which comprise at least one solvent or a mixture of different solvents, at least one polymeric binder and, optionally, further additives, at least one of the polymeric binders comprising a hyperbranched high-functionality polyester of the invention, and also provides for the use of the print varnishes of the invention for priming, as a protective varnish and for producing multilayer materials.

The print varnishes of the invention of course comprise no colorants, but apart from that have the same constituents as the printing inks of the invention already outlined. The amounts of the remaining components increase correspondingly.

Surprisingly, through the use of printing inks, especially packaging inks, and print varnishes with binders based on hyperbranched polyesters, multilayer materials with outstanding adhesion between the individual layers are obtained. The addition of adhesion promoters is preferably no longer necessary.

The multilayer materials according to the invention comprise at least two pieces of film 1 and film 2, at least one layer which is printed with the ink according to the invention and further optionally at least one adhesive layer between the ink and one of the films. In a preferred embodiment of the present invention an adhesive layer between the ink and one of the films is present.

The adhesive can be selected from those adhesives which are typically used for that purpose, for example but not limited to polyurethane dispersions, polyacrylates, single package polyurethane adhesives, two-component polyurethane adhesives and low melting polyethylene in extrusion lamination process.

The printing varnishes of the invention naturally do not contain colorants, but apart from that contain the same constituents as the printing inks outlined above. The amounts of the other components are increased accordingly.

The print layer obtainable with the packaging printing ink has essentially the same composition as the printing ink, except that some or all of the solvents and any volatiles present undergo evaporation.

The present technology, thus generally described, will be understood more readily by reference to the following examples, which are provided by way of illustration and are not intended to be limiting.

EXAMPLES

General Procedure

Molecular weights were determined by gel permeation chromatography (GPC);

eluent: tetrahydrofuran (THF); reference material: PMMA.

Acid values (AN) were determined according to previous DIN 53402.

Hydroxyl values (OH value) were determined according to DIN 53240, part 2.

Glas transition temperatures (Tg) were measured using differential scanning calorimetry (DSC). During the measurement, samples were cooled down to a starting temperature approximately 50° C. below the $T_g$ expected and then heated up to a final temperature approximately 50° C. above the $T_g$ expected with a rate of 10° C./min. The given Tg represents the result of the second heating cycle.

DBTL=dibutyl tin dilaurate

TMP=trimethylolpropane

HPAA=1,2-cyclohexane dicarboxylic anhydride (CAS 85-42-7)

Synthesis of Hyperbranched Polyesters

Comparative Example 1

(Analogous to Product of Example 1 of US 2005/0147834 A1)

In a 2 liter round bottom flask equipped with mechanical stirrer, thermometer, gas inlet and distillation apparatus with collecting flask, 680 g (4.65 mol) of adipic acid, and 520 g (3.88 mol) TMP were placed. 0.36 g DBTL were added as a catalyst and the reaction mixture was heated to 160° C. upon stirring. The mixture was stirred at 160° C. for 3 h and reaction water was collected. The reaction was followed by acid number and stopped by cooling down to ambient temperature when an acid number of 87 mg KOH/g polymer was reached.

The product was obtained as colorless resin. AN=87 mg KOH/g polymer, OH value=226 mg KOH/g polymer, $M_n$=2200 g/mol, $M_w$=13100 g/mol, Tg=−30° C.

Comparative Example 2

(Analogous to Product of Example 2 of US 2005/0147834 A1)

In a 2 liter round bottom flask equipped with mechanical stirrer, thermometer, gas inlet and distillation apparatus with collecting flask, 680 g (4.65 mol) of adipic acid, and 520 g (3.88 mol) TMP were placed. 0.36 g DBTL were added as a catalyst and the reaction mixture was heated to 160° C. upon stirring. The mixture was stirred at 160° C. for 4 h and reaction water was collected. The reaction was followed by acid number and stopped by cooling down to ambient temperature when an acid number of 100 mg KOH/g polymer was reached.

The product was obtained as colorless resin. AN=100 mg KOH/g polymer, OH value=215 mg KOH/g polymer, $M_n$=1100 g/mol, $M_w$=4900 g/mol, Tg=−31° C.

Comparative Example 3

(Analogous to Product of Example 12 of US 2007/213501 A1)

In a 2 liter round bottom flask equipped with mechanical stirrer, thermometer, gas inlet and distillation apparatus with collecting flask, 742 g (5.10 mol) of adipic acid, 257 g (2.80 mol) glycerol, and 201 g (1.40 mol) 1,4-dimethylol-cyclohexane were placed. 0.6 g DBTL were added as catalyst and the reaction mixture was heated to 160° C. upon stirring. The mixture was stirred at 160° C. for 8 h and reaction water was collected. The reaction was followed by acid number and stopped by cooling down to ambient temperature when an acid number of 95 mg KOH/g polymer was reached.

The product was obtained as colorless resin. AN=95 mg KOH/g polymer, OH value=151 mg KOH/g polymer, $M_n$=1920 g/mol, $M_w$=10220 g/mol, Tg<−35° C.

Example 4

In a 2 liter round bottom flask equipped with mechanical stirrer, thermometer, gas inlet and distillation apparatus with collecting flask, 580 g (3.76 mol) of HPAA, and 420 g (3.13 mol) TMP were placed. 0.3 g DBTL were added as catalyst and the reaction mixture was heated to 160° C. upon stirring. The mixture was stirred at 180° C. for 6 h and reaction water was collected. The reaction was followed by acid number and stopped by cooling down to ambient temperature when an acid number of 92 mg KOH/g polymer was reached.

The product was obtained as colorless brittle solid. AN=92 mg KOH/g polymer, OH value=187 mg KOH/g polymer, $M_n$=500 g/mol, $M_w$=2200 g/mol, Tg=44° C.

Example 5

In a 1 liter round bottom flask equipped with mechanical stirrer, thermometer, gas inlet and distillation apparatus with collecting flask, 348 g (2.26 mol) of HPAA, and 252 g (1.88 mol) TMP were placed and heated to 180° C. for 5.5 h and reaction water was removed during that time. The reaction was followed by acid number and stopped by cooling down to ambient temperature when an acid number of 93 mg KOH/g polymer was reached.

The product was obtained as colorless brittle solid. AN=92 mg KOH/g polymer, OH value=191 mg KOH/g polymer, $M_n$=740 g/mol, $M_w$=2400 g/mol, Tg=35° C.

Example 6

In a 2 liter round bottom flask equipped with mechanical stirrer, thermometer, gas inlet and distillation apparatus with collecting flask, 551 g (3.7 mol) of 1,2-phtalic acid anhydride, and 500 g (3.7 mol) TMP were placed. 0.3 g DBTL were added as catalyst and the reaction mixture was heated to 180° C. upon stirring for 7 h and reaction water was collected. The reaction was followed by acid number and stopped by cooling down to ambient temperature when an acid number of 40 mg KOH/g polymer was reached.

The product was obtained as yellow brittle solid. AN=36 mg KOH/g polymer, OH value=236 mg KOH/g polymer, $M_n$=1590 g/mol, $M_w$=6530 g/mol, Tg=44° C.

A number of flexographic printing inks were prepared by mixing nitrocellulose based color dispersions with the aforementioned procedure examples.

Ink Formulation and Testing: ink typically is made by mixing a color dispersion which contains colorants, dispersing resins, dispersing additives and solvents, with letdown vehicles which are composed of polymer binders, additives, and solvents.

Color dispersions were prepared by grinding pigments with the Lau™ Disperser DAS H 200-K paint shaker using glass beads with 2 mm diameter as grinding media. Below are typical dispersion formulations used for white and color inks.

| Dispersion Composition | White dispersion | Color dispersion |
|---|---|---|
| Pigment | Titanium oxide | Blue 15:4 |
| % Pigment | 56% | 26% |
| % Dispersant | 7% | 7.5% |
| Solvents | 37% | 66.5% |
| n-Propanol/n-Propyl acetate 80/20 | | |

Titanium oxide used in the invention was Kemari RODI. Phthalocyanine blue 15:4 was Toyo blue 7400G The letdown vehicle was prepared using the hyperbranched polyester samples as listed in the aforementioned examples by dissolving at least 50% but no greater than 75% by weight of hyperbranched polyesters in a standard solvent, typically n-propanol. The base inks were obtained by mixing color dispersion with letdown vehicles at a standard ratio with appropriate amount of solvent. The base ink viscosity of the base inks were measured using Brookfield (ASTM D2196) then it was adjusted close to 100 mPas print viscosity at 25° C. for flexographic printing with solvent mix. The finish ink compositions (by weight %) at print viscosity are summarized for white and blue inks in the tables below. All examples were soluble in n-propanol and made stable inks, except those polyesters according to example-1, -2, and -3. Inks made with polyesters from example-1, -2, and -3 exhibited phase separation on standing at 25° C. for 24 hours. Control ink was made of polyurethane NeoRez® U335 ink vehicle. NeoRez® U335, available from DSM NeoResins Inc., Wilmington, is a non-reactive high molecular weight semialiphathic polyurethane recommended in flexo and for gravure printing ink formulations.

TABLE 1

Ink composition of white inks

| Sample no. | TiO2 | Nitrocellulose | Binder | Solvent | Sum |
|---|---|---|---|---|---|
| Example-4 | 35.2 | 4.4 | 11.8 | 48.6 | 100 |
| Example-5 | 36.9 | 4.6 | 12.3 | 46.2 | 100 |
| Example-6 | 34.5 | 4.3 | 11.6 | 49.6 | 100 |
| Control | 29.0 | 3.6 | 9.7 | 57.7 | 100 |

TABLE 2

Ink composition of blue inks

| Sample no. | Blue 15:4 | Nitrocellulose | Binder | Solvent | Sum |
|---|---|---|---|---|---|
| Example-4 | 19.3 | 4.8 | 11.9 | 64.0 | 100 |
| Example-5 | 19.4 | 4.9 | 12.0 | 63.7 | 100 |
| Example-6 | 18.7 | 4.7 | 11.6 | 65.0 | 100 |
| Control | 16.2 | 4.0 | 10.0 | 69.8 | 100 |

Inks were drawn down on a PET film (Dupont™48LBT) with 42 dyne/cm surface tension using a K-Coater (from RK Print-Coat Instruments Ltd) and K-1 rod with 0.08 mm wire diameter giving 6 micron-meter wet film deposit.

Following test protocols were used to determine physical properties of printed film.

Tape Adhesion Test

A popular practice to check ink adhesion on a printed film in the printing industry is tape adhesion (ASTM F 2252-03). Measurements were conducted after ink drawn down for one hour at room temperature to make sure solvent was completely evaporated. Results were rated in 1-5 scale; 5 as no ink pulled off from the film and 1 as 100% pulled off from the film.

Blocking Resistance

Blocking resistance is measured by using a spring loaded press, K53000 I.C. block tester, from Koehler Instrument. This test is to emulate a roll of printed film that is under storage conditions with heat and pressure. The blocking test is set at 10 psi, 50° C. for 16 hours. The rating was in 1-5 scale ; 5 as the best with no ink peel off 1 as 100% pulled off from the film.

Peel Strength of Lamination

A critical performance for a lamination ink is the ability to form an integral laminate with an aid of adhesive which is bonding a printed film with a sealant film which is normally polyolefin film with a lower melting point such as LDPE, low density polyethylene. Tycel™ UR7975/UR6029 (from Liofol Corporation) was used as adhesive. Bond Strength of lamination samples was evaluated by Instron™, a tensile tester. The most common configuration is a standard T-peel, which involves pulling apart two strips of substrate that have been adhered together resulting in a "T" formation (ASTM D1876).

Typical peel force measurement is conducted at a constant peel rate between 1 to 20 inches per minute, preferably 6 to 15 inches per minute. The threshold for the bond strength is the minimal force to tear the packaging film. A destructive bond strength is always preferred. A typical lamination packaging the threshold is about 135 gram-force per liner centimeter. Bond strength measurement beyond 135 gm/cm is the minimum force to achieve destructive bond strength.

Ink performance of white and blue inks are summarized in Table 3 and 4.

TABLE 3

Ink performance of white inks

| Sample no. | Tape adhesion | Blocking: face/back | Film Tear |
|---|---|---|---|
| Example-4 | 5 | 5 | yes |
| Example-5 | 5 | 5 | yes |
| Example-6 | 5 | 5 | yes |
| control | 5 | 5 | yes |

TABLE 4

Ink performance of blue inks

| Sample no. | Tape adhesion | Blocking: face/back | Film Tear |
|---|---|---|---|
| Example-4 | 5 | 5 | yes |
| Example-5 | 5 | 5 | yes |
| Example-6 | 5 | 5 | yes |
| Control | 5 | 5 | yes |

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

The invention claimed is:

1. A multilayer material comprising:
a first film comprising a polymeric material;
at least one print layer comprising a packaging printing ink; and
a second film;
wherein:
   the packaging printing ink comprises 5 wt % to 35 wt % of a binder, based on the sum of all constituents in the packaging printing ink, wherein the binder comprises a first binder and a second binder;
   the first binder comprises at least one hyperbranched polyester containing functional groups selected from the group consisting of OH, COOH and COOR groups, wherein R comprises groups having from 1 to 60 carbon atoms and optionally may also contain heteroatoms or further substituents;
   the hyperbranched polyester comprises the polymerization product of:
      at least one acid selected from the group consisting of 1,2-cyclohexane dicarboxylic acid, 1,3-cyclohexane dicarboxylic acid, and 1,4-cyclohexane dicarboxylic acid or anhydrides thereof; and
      at least one at least trivalent aliphatic alcohol selected from the group consisting of trimethylolpropane, glycerol, and pentaerythritol;
   wherein:
      the at least trivalent aliphatic alcohol hydroxyl groups to the acid carboxyl groups have a ratio of 2:1 to 1:2; and
      the hyperbranched polyester has a number average molecular weight of 300 g/mol to 10,000 g/mol, a weight average molecular weight to number average molecular weight ratio of about 1.3:1 to 5:1, and a glass transition temperature of from 30° C. to 50° C.;
   the second binder comprises nitrocellulose; and
   a weight ratio of the hyperbranched polyester to the total amount of all the binders is greater than 50% by weight and less than 80% by weight, and wherein the package printing ink further comprises about 40% by weight to about 80% by weight of at least one solvent.

2. The multilayer material of claim 1, wherein the first film is selected from the group consisting of polyethylene, polypropylene, polystyrene, polyester and polyamide.

3. The multilayer material of claim 1, wherein the second film is selected from the group consisting of polyethylene, polypropylene, polystyrene, polyester, polyamide and aluminum.

4. The multilayer material of claim 1, wherein the at least one acid is 1,2-cyclohexane dicarboxylic acid or 1,2-cyclohexane dicarboxylic acid anhydride.

5. The multilayer material of claim 1, wherein the trivalent aliphatic alcohol is trimethylolpropane.

6. A printing ink comprising:
5 wt % to 35 wt % of a binder, based on the sum of all constituents in the printing ink, wherein the binder comprises a first binder and a second binder; and
at least one solvent;
wherein:
   the first binder comprises at least one hyperbranched polyester, the hyperbranched polyester comprises the polymerization product of:
      at least one acid selected from the group consisting of 1,2-cyclohexane dicarboxylic acid, 1,3-cyclohexane dicarboxylic acid, and 1,4-cyclohexane dicarboxylic acid or anhydrides thereof; and
      at least one at least trivalent aliphatic alcohol selected from the group consisting of trimethylolpropane, glycerol, and pentaerythritol;
   wherein:
      the at least trivalent aliphatic alcohol hydroxyl groups to the acid carboxyl groups have a ratio of 2:1 to 1:2; and
      the hyperbranched polyester has a number average molecular weight of 300 g/mol to p10,000 g/mol, a weight average molecular weight to number average molecular weight ratio of about 1.3:1 to 5:1, and a glass transition temperature of from 30° C. to 50° C.;
   the second binder comprises nitrocellulose; and
   a weight ratio of the hyperbranched polyester to a total amount of all the binders is greater than 50% by weight and less than 80% by weight, and wherein the printing ink comprises about 40% by weight to about 80% by weight of the at least one solvent.

7. The printing ink of claim 6 further comprising at least one colorant.

8. The printing ink of claim 7, wherein the colorant comprises titanium dioxide, iron oxide, an interference pigment, carbon black, a metal powder, an azo pigment, a phthalocyanine pigment, an isoindoline pigment.

9. The printing in of claim 7, wherein the colorant comprises phthalocyanine blue 15:4, phthalocyanine green 7, green 36, yellow 12, yellow 14, red 57:1, or red 52:1.

10. The printing ink of claim 6 further comprising an additive selected from the group consisting of calcium carbonate, aluminum oxide hydrate, aluminum silicate, magnesium silicate, a wax, a fatty acid amide, a plasticizer, a dispersing agent, and an adhesion promoter.

11. The printing ink of claim 10, wherein the additive is present in the ink from 0 wt % to 20 wt %.

12. The printing ink of claim 6, wherein the at least one acid is 1,2-cyclohexane dicarboxylic acid or 1,2-cyclohexane dicarboxylic acid anhydride.

13. The printing ink of claim 6, wherein the trivalent aliphatic alcohol is trimethylolpropane.

* * * * *